US012807051B2

(12) United States Patent
Williams

(10) Patent No.: US 12,807,051 B2
(45) Date of Patent: Nov. 24, 2026

(54) ADJUSTABLE BELTLINE ARMREST STRUCTURES FOR VEHICLES

(71) Applicant: Toyota Motor Engineering & Manufacturing North America, Inc., Plano, TX (US)

(72) Inventor: Paxton S. Williams, Milan, MI (US)

(73) Assignees: Toyota Motor Engineering & Manufacturing North America, Inc., Plano, TX (US); Toyota Jidosha Kabushiki Kaisha

( * ) Notice: Subject to any disclaimer, the term of this patent is extended or adjusted under 35 U.S.C. 154(b) by 356 days.

(21) Appl. No.: 18/539,840

(22) Filed: Dec. 14, 2023

(65) Prior Publication Data

US 2025/0196742 A1 Jun. 19, 2025

(51) Int. Cl.
*B60N 2/75* (2018.01)
*B60J 5/04* (2006.01)
*B60R 13/02* (2006.01)

(52) U.S. Cl.
CPC ............... *B60N 2/77* (2018.02); *B60J 5/0411* (2013.01); *B60J 5/0413* (2013.01); *B60R 13/0243* (2013.01)

(58) Field of Classification Search
CPC ....... B60N 2/77; B60J 5/0411; B60J 5/04163; B60R 13/0243
See application file for complete search history.

(56) References Cited

U.S. PATENT DOCUMENTS

| | | | | |
|---|---|---|---|---|
| 5,902,006 | A * | 5/1999 | Janker | B60R 13/02 296/146.7 |
| 6,837,544 | B2 | 1/2005 | Brnchen et al. | |
| 7,144,067 | B2 | 12/2006 | Gramss | |
| 7,537,268 | B2 | 5/2009 | Becker et al. | |
| 9,216,675 | B2 | 12/2015 | Jayasuriya et al. | |
| 9,987,957 | B2 | 6/2018 | Cavalieri | |
| 2005/0023861 | A1* | 2/2005 | Hirotani | B60N 2/4235 296/187.05 |
| 2006/0163933 | A1* | 7/2006 | Radu | B60N 2/767 297/411.35 |

(Continued)

FOREIGN PATENT DOCUMENTS

| | | | |
|---|---|---|---|
| CN | 212796627 | U | 3/2021 |
| CN | 113212276 | A | 8/2021 |

(Continued)

OTHER PUBLICATIONS

Car Armrest Elbow Support Adjustable Universal Door Hand Arm Rest Anti-fatigue (https://www.fruugo.ie/car-armrest-elbow-support-adjustable-universal-door-hand-arm-rest-anti-fatigue-hand-rest-cushion-mini-leather-box-pad-universal/p-110120746-232358450?language=en) Publication date: Sep. 4, 2023.

*Primary Examiner* — Taras P Bemko
(74) *Attorney, Agent, or Firm* — Dinsmore & Shohl LLP

(57) ABSTRACT

A vehicle includes a door assembly that includes an adjustable beltline armrest structure including a trim body having an upper terminal edge that is adjacent an inner belt molding at a window frame of the door assembly and a laterally extending armrest portion. The trim body is moveable in a vehicle vertical direction between a raised position with the armrest portion closer to the beltline molding and a lowered position with the armrest portion farther from the beltline molding.

12 Claims, 4 Drawing Sheets

(56) References Cited

U.S. PATENT DOCUMENTS

| | | | | |
|---|---|---|---|---|
| 2007/0080560 | A1* | 4/2007 | Sommer | B60N 2/783 296/153 |
| 2008/0012415 | A1* | 1/2008 | Becker | B60N 2/02246 297/411.21 |
| 2008/0054676 | A1* | 3/2008 | Sommer | B60N 2/78 296/153 |
| 2008/0224498 | A1* | 9/2008 | Hughes | B60N 2/783 296/153 |
| 2015/0291069 | A1* | 10/2015 | Jayasuriya | B60R 13/0243 296/153 |
| 2018/0050582 | A1* | 2/2018 | Walawender | B60J 10/75 |

FOREIGN PATENT DOCUMENTS

| | | | |
|---|---|---|---|
| DE | 102006028043 | A1 | 4/2007 |
| DE | 202014009206 | U1 | 3/2016 |
| FR | 3068653 | B1 | 6/2020 |
| KR | 19980046365 | U | 9/1998 |
| KR | 100418614 | B1 | 2/2004 |

* cited by examiner

ADJUSTABLE BELTLINE ARMREST STRUCTURES FOR VEHICLES

TECHNICAL FIELD

The present specification generally relates to armrest structures for vehicle doors and, more specifically, adjustable beltline armrest structures for vehicle doors.

BACKGROUND

It is somewhat common for vehicle drivers and passengers to rest their arm at the beltline of vehicle doors, above the armrest. For some vehicles, the beltline area can be somewhat elevated to a point where it may be uncomfortable to rest one's arm. Accordingly, it may be desirable to provide other armrest structures.

SUMMARY

In one embodiment, a vehicle includes a door assembly that includes an adjustable beltline armrest structure including a trim body having an upper terminal edge that is adjacent an inner belt molding at a window frame of the door assembly and a laterally extending armrest portion. The trim body is moveable in a vehicle vertical direction between a raised position with the armrest portion closer to the beltline molding and a lowered position with the armrest portion farther from the beltline molding.

In another embodiment, a vehicle includes a door assembly that includes an interior door panel including a lower armrest including a first laterally extending armrest portion. An adjustable beltline armrest structure includes a trim body including a second laterally extending armrest portion above the first laterally extending armrest portion. The trim body moveable in a vehicle vertical direction between a raised position with the armrest portion closer to a beltline molding and a lowered position with the armrest portion farther from the beltline molding.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to vehicles including door assemblies with an adjustable beltline armrest structure. The adjustable beltline armrest structure includes a trim body having an upper terminal edge that is received by an inner beltline molding at a window frame of door assembly and a laterally extending armrest portion. The trim body is moveable in a vehicle vertical direction between a raised position with the armrest portion closer to the beltline molding and a lowered position with the armrest portion farther from the beltline molding.

Figure 1:
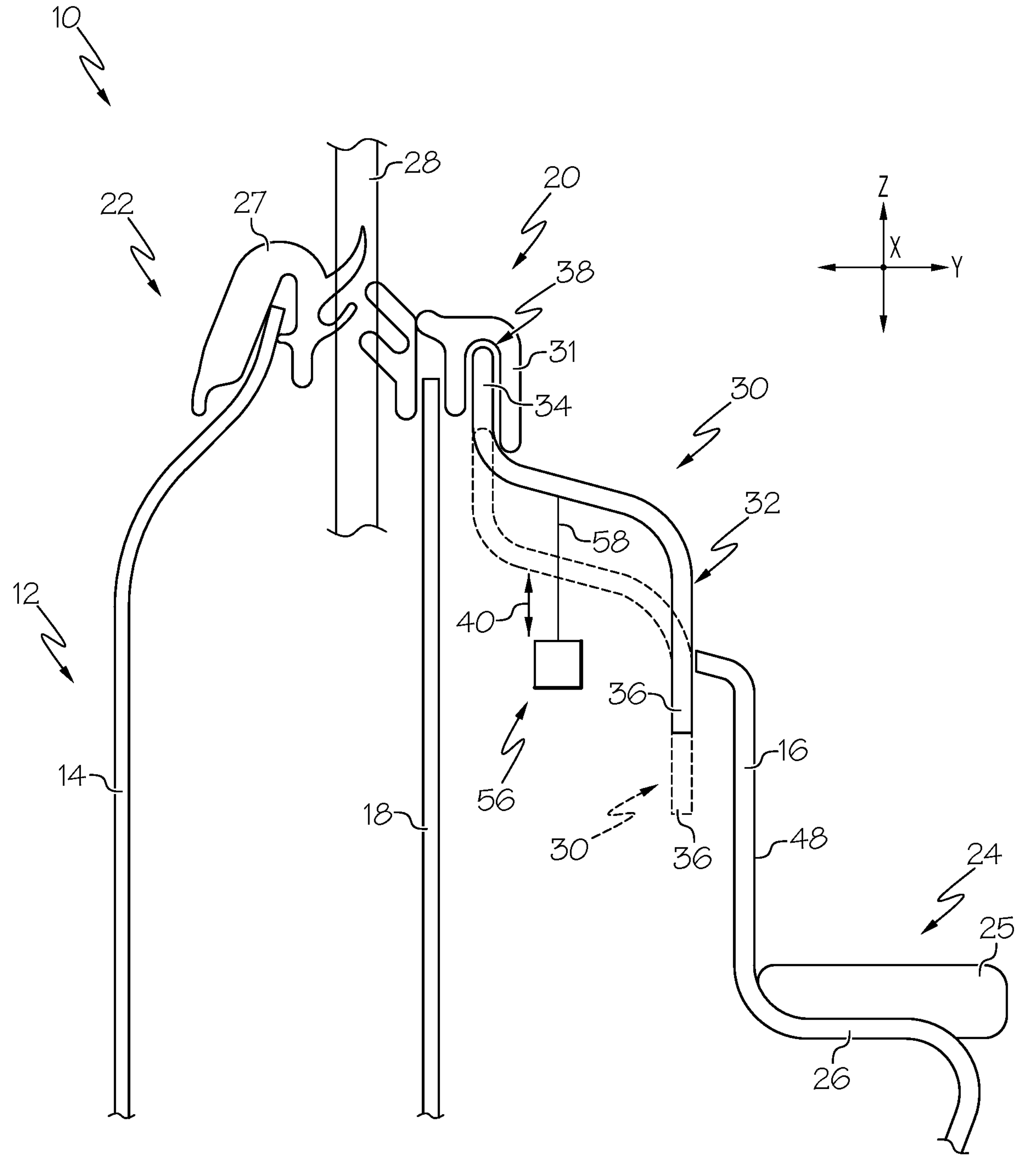
FIG. 1 is a section view of a vehicle door assembly of a vehicle including an adjustable beltline armrest structure, according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction of the vehicle (i.e., in the +/− vehicle Y-direction depicted in FIG. 1), and is transverse to the vehicle longitudinal direction. Further, the terms "inboard" and "outboard" are used to describe the relative positioning of various components relative to a centerline of the vehicle. Because the vehicle structure of the vehicle may be generally symmetrical about the vehicle centerline, the use of terms "inboard" and "outboard" may be switched when evaluating components positioned along opposite sides of the vehicle.

Referring to FIG. 1, a vehicle, represented by element 10, includes a door assembly 12 including an exterior door panel 14 at an exterior side of the door assembly 12 and an interior door panel 16 at an interior side of the door assembly 12. An inner door panel 18 may be located between the exterior and interior door panels 14 and 16. A beltline molding 20 may be located at a window frame 22 of the door assembly 12. The beltline molding 20 includes an outer belt molding 27 that can provide a seal between the exterior door panel 14 and a window 28 and an inner belt molding 31 that can provide a seal between the interior door panel 16 and the window 28. As used herein, the term "beltline" refers to a line representing the bottom edge of a vehicle's glass panels (e.g. front window, side windows and rear window).

The interior door panel 16 may form a lower armrest 24 that is provided at a laterally extending armrest portion 26 of the interior door panel 16. The lower armrest 24 may include a cushion 25 or padding located on the interior door panel 16 at the laterally extending armrest portion 26. An adjustable beltline armrest structure 30 is located above the lower armrest 24 and includes a trim body 32 having an upper terminal edge 34 and a lower terminal edge 36. The upper terminal edge 34 is received by a groove 38 within the beltline molding 20 at the window frame 22 of the door assembly 12. The trim body 32 is moveable in a vehicle vertical direction, represented by the arrow 40, between a raised position with the armrest portion 26 closer to the beltline molding 20 and a lowered position with the armrest portion 26 farther from the beltline molding 20 shown by dashed lines. In the raised position, the upper terminal edge 34 may move farther into the groove 38 and in the lowered position, the upper terminal edge may move farther out of the groove 38.

Figure 2:
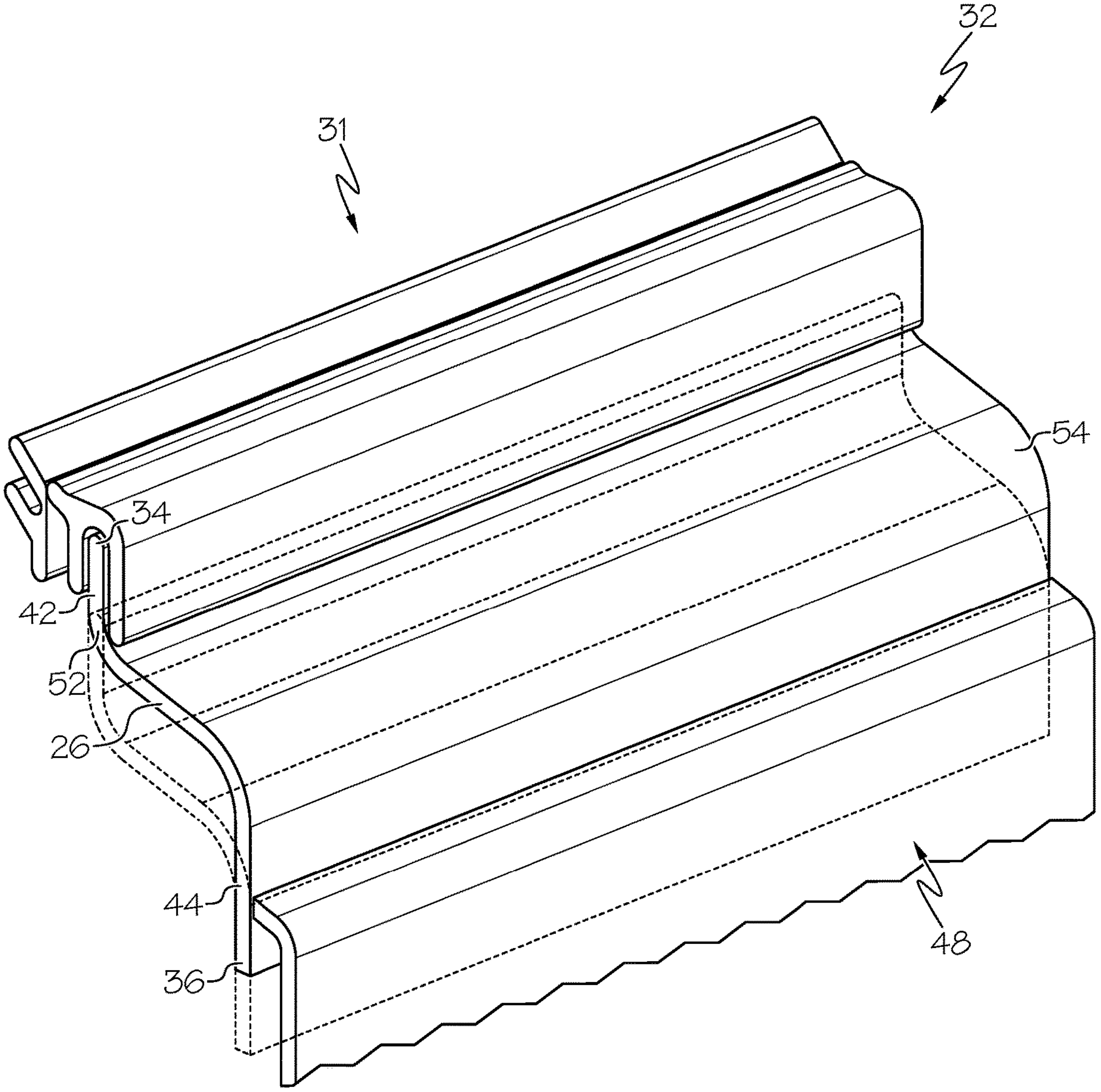
FIG. 2 is a perspective view of a trim body of the an adjustable beltline armrest structure and an inner belt molding of FIG. 1, according to one or more embodiments shown and described herein.

Referring also to FIG. 2 showing the trim body 32 and inner belt molding 31 in isolation, the trim body 32 may include an upper vertical portion 42 that includes the upper terminal edge 34 and extends vertically upward from the laterally extending armrest portion 26 at a bend 52 and a lower vertical portion 44 that includes the lower terminal edge 36 and extends vertically downward from the laterally extending armrest portion 26 at a bend 54. The upper vertical portion 42 may be received behind the inner belt molding 31, while the lower vertical portion 44 may be received behind a vertical portion 48 of the interior door panel 16, above the laterally extending armrest portion 26.

Figure 3:
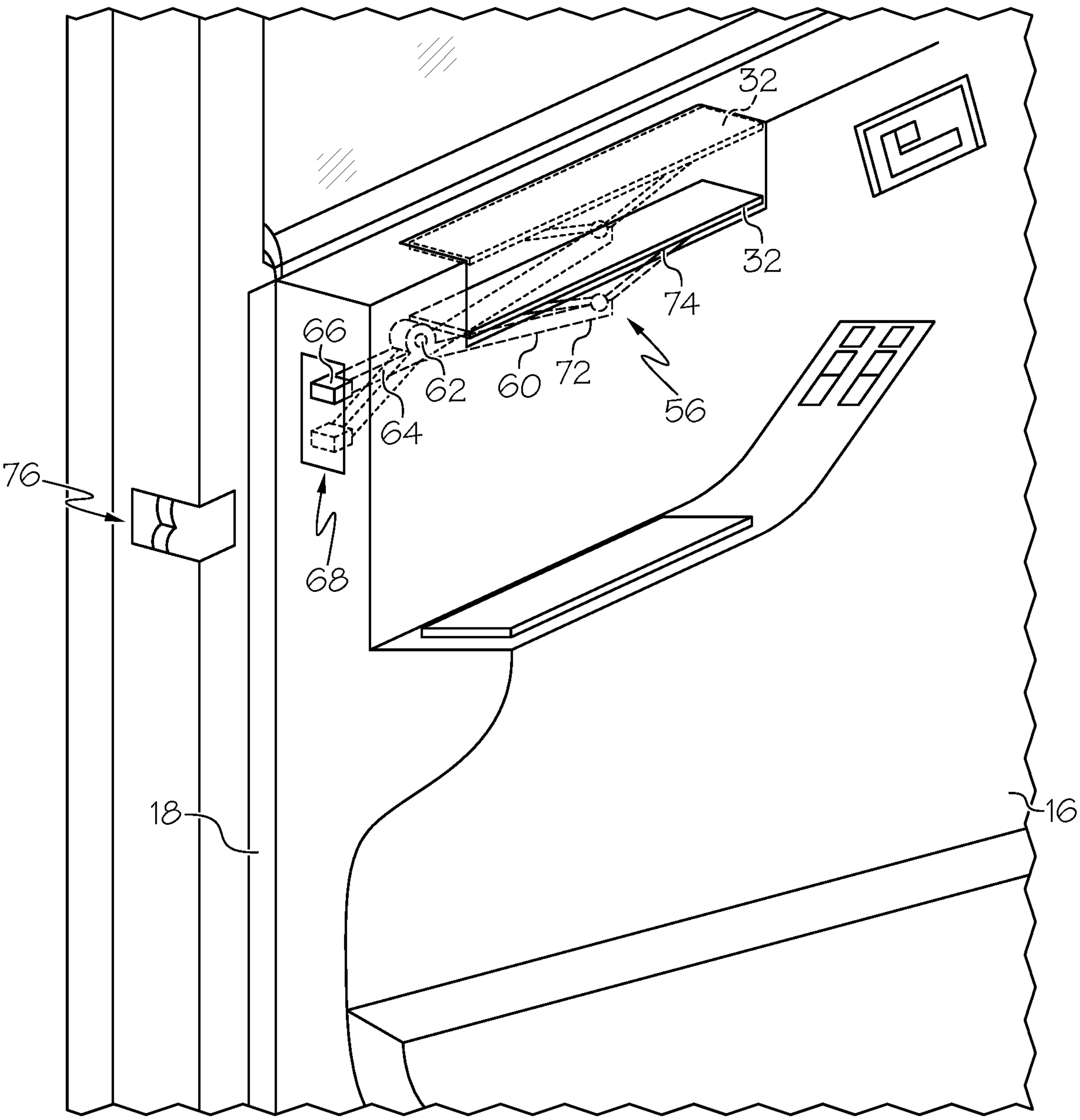
FIG. 3 is a perspective interior view of the vehicle door assembly of FIG. 1 including the adjustable beltline armrest structure, according to one or more embodiment shown and described herein.

An actuator 56 may be operatively linked to the trim body 32 by linkage 58 and be configured to move the trim body 32 between the raised and lowered positions. The actuator 56 may be any suitable actuator, such as a motor, air or hydraulic cylinder, manually actuated lever, etc. As an example, referring to FIG. 3, an actuator 56 is a manually-operated actuator 56 that includes a lever arm 60 that can be rotatably connected to the inner door panel 16 at a pivot location 62. In another embodiment, the lever arm 60 may be pivotally connected to the interior door panel 16. The lever arm 60 includes a handle portion 64 on a rearward side of the pivot location 62 and having an end 66 located at an access opening 68 at a rear edge 70 of the interior door panel 16 near a door latch assembly 76 and an engagement portion 72 on a forward side of the pivot location 62 having an end effector 74 that is configured to engage the trim body 32 and move the trim body up and down between the raised and lowered positions. A passenger of the vehicle may use a finger, for example, to actuate the lever arm 60 through the access opening 68. A locking mechanism, also represented by element 62, may be provided to hold the lever arm 60 in raised and/or lowered positions.

Figure 4:
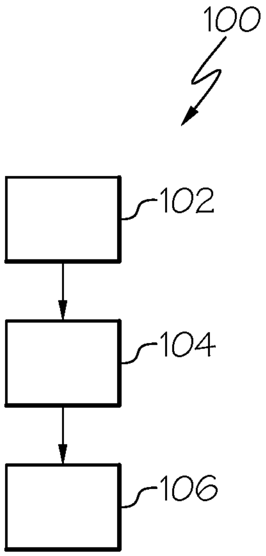
FIG. 4 is a schematic view of a method of supporting an arm of a passenger of a vehicle on the vehicle door assembly of FIG. 1 near a beltline of the vehicle, according to one or more embodiments shown and described herein.

Referring to FIG. 4, a method 100 of supporting an arm of a passenger of a vehicle 10 on a vehicle door assembly 12 near a beltline of the vehicle 10 includes, at step 102, lowering the trim body 32 of the adjustable beltline armrest structure 30 using the actuator 56 located within the vehicle door assembly 12 from a raised position to a lowered position. The adjustable beltline armrest structure 30 is located above the lower armrest 24 near the beltline. At step 104, the passenger places the arm on the adjustable beltline armrest structure 30 in the lowered position. At step 106, the adjustable beltline armrest structure 30 is raised from the lowered position to the raised position nearer the beltline.

The above-described vehicle door assemblies include adjustable beltline armrest structures that can increase a comfort level of a passenger when resting an arm on the vehicle door assemblies near the beltline of the vehicles. The adjustable beltline armrest structures allow a portion of the outer door panel near the beltline to be placed in a lowered position so that the passenger does not need to raise the arm to an uncomfortable height near the beltline.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:

a door assembly comprising an adjustable beltline armrest structure comprising a trim body having an upper terminal edge that is adjacent an inner belt molding at a window frame of the door assembly and a laterally extending armrest portion, the trim body being moveable in a vehicle vertical direction between a raised position with the armrest portion closer to the beltline molding and a lowered position with the armrest portion farther from the beltline molding; and an actuator configured to move the trim body between the raised position and the lowered position, the actuator comprising a lever arm comprising a handle portion configured to be engaged manually located at a side of a pivot location and an engagement portion configured to engage the trim body located at an opposite side of the pivot location, the handle portion is manually accessible through an access opening in a rear edge of the door assembly.

2. The vehicle of claim 1, wherein the inner belt molding has a groove configured to receive the upper terminal edge of the trim body.

3. The vehicle of claim 1, wherein the trim body comprises a lower terminal edge that is adjacent an interior door panel.

4. The vehicle of claim 1, wherein the lever arm is pivotally connected to an inner door panel of the door assembly, the inner door panel located between an interior door panel and an exterior door panel of the door assembly.

5. The vehicle of claim 1, wherein the laterally extending armrest portion is located above a lower armrest of an interior vehicle panel.

6. A vehicle comprising:

a door assembly comprising:

an interior door panel comprising a lower armrest comprising a first laterally extending armrest portion;

an adjustable beltline armrest structure comprising a trim body comprising a second laterally extending armrest portion above the first laterally extending armrest portion, the trim body moveable in a vehicle vertical direction between a raised position with the armrest portion closer to a beltline molding and a lowered position with the armrest portion farther from the beltline molding; and an actuator configured to move the trim body between the raised position and the lowered position, the actuator comprising a lever arm comprising a handle portion configured to be engaged manually located at a side of a pivot location and an engagement portion configured to engage the trim body located at an opposite side of the pivot location, the handle portion is manually accessible through an access opening in a rear edge of the door assembly.

7. The vehicle of claim 6, wherein the door assembly comprises an inner belt molding having a groove configured to receive an upper terminal edge of the trim body.

8. The vehicle of claim 6, wherein the trim body comprises a lower terminal edge that is adjacent the interior door panel.

9. The vehicle of claim 8, wherein the lever arm is pivotally connected to an inner door panel of the door assembly, the inner door panel located between an interior door panel and an exterior door panel of the door assembly.

10. The vehicle of claim 6, wherein the actuator comprises a motor, pneumatic cylinder or hydraulic cylinder.

11. A method of supporting an arm of a passenger of a vehicle on a vehicle door assembly near a beltline of the vehicle comprising:

lowering a trim body of an adjustable beltline armrest structure using an actuator from a raised position to a lowered position, the adjustable beltline armrest structure is located above a lower armrest, the actuator comprising:

a lever arm comprising a handle portion configured to be engaged manually located at a side of a pivot location and an engagement portion configured to engage the trim body located at an opposite side of the pivot location, the handle portion is manually accessible through an access opening in a rear edge of the door assembly; and placing an arm on the adjustable beltline armrest structure in the lowered position.

12. The method of claim 11 further comprising raising the adjustable beltline structure from the lowered position to the raised position nearer a beltline of the vehicle relative to the lowered position.

* * * * *